Nov. 10, 1953    C. S. WEYANDT    2,658,609
DUAL MOTOR MATERIAL HANDLING DEVICE
Filed May 3, 1949    3 Sheets-Sheet 1

INVENTOR.
CARL S. WEYANDT
BY
William D. Carothers
HIS ATTORNEY.

Nov. 10, 1953  C. S. WEYANDT  2,658,609
DUAL MOTOR MATERIAL HANDLING DEVICE
Filed May 3, 1949  3 Sheets-Sheet 2

INVENTOR.
CARL S. WEYANDT
BY
HIS ATTORNEY

Nov. 10, 1953  C. S. WEYANDT  2,658,609
DUAL MOTOR MATERIAL HANDLING DEVICE
Filed May 3, 1949  3 Sheets-Sheet 3
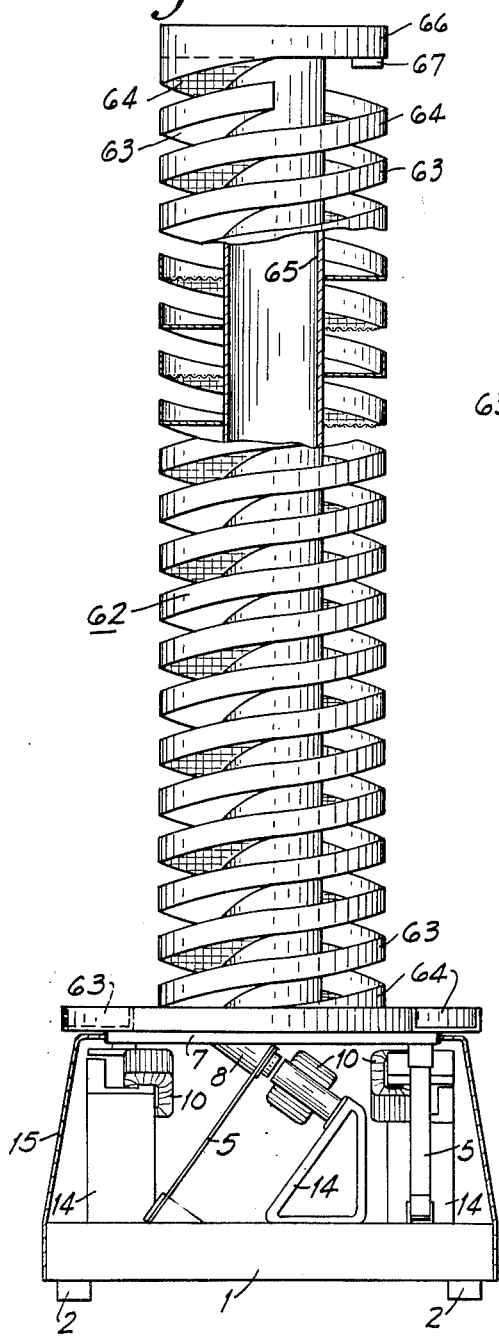
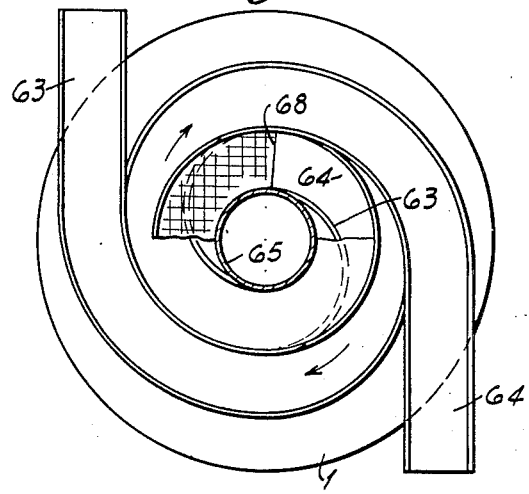
INVENTOR.
CARL S. WEYANDT
BY
HIS ATTORNEY.

Patented Nov. 10, 1953

2,658,609

UNITED STATES PATENT OFFICE 2,658,609

DUAL MOTOR MATERIAL HANDLING DEVICE

Carl S. Weyandt, Homer City, Pa.

Application May 3, 1949, Serial No. 91,140

3 Claims. (Cl. 198—220)

This invention relates generally to vibratory devices for handling bulk material wherein a circular movement is imparted to the material being handled and more particularly to circular packing, screening or helical conveying devices which impart a circular movement to the material being packed, screened or conveyed to different elevations and is further directed to electromagnetically operated packers, screens or conveyors.

Electromagnetically operated material handling vibratory devices may be supported on inclined springs symmetrically disposed about a common axis for reciprocating the device in a confined inclined arcuate path of movement and which provides a natural period of vibration slightly above or below the operating current impulses. When the material is confined on a uniplanar floor within a cylindrical wall and is vibrated to flow in a circular path it becomes uniformly distributed and packed. If the cylindrical wall has a helical trough the material flows along the helix to another elevation. If one or more subjacent tiers of screens, the mesh of which diminish in size, are rigidly supported with the floor for vibration the material moves circularly over the surface of the screens and continuous gradation of the material may be made. The inclined arcuate vibratory movement of the device should be uniformly distributed symmetrically about a vertical central axis to avoid distorted movement and the material container, screen or helical conveyor is preferably centered relative to this axis whether it is a separate or an integral part of the vibratory structure.

This invention is an improvement over the structure disclosed in the United States Letters Patent No. 2,464,216, issued March 15, 1949, for Vibratory Conveyor, which structure provides for the application of vibratory forces axially to a helical conveyor mounted to reciprocate in a confined inclined arcuate path of movement.

A principal object of this invention is the provision of a plurality of electromagnetic reciprocating motors arranged for mounting symmetrically about the central axis of a material handling device that is supported for vibration in a confined inclined arcuate path of movement. The motors are symmetrically arranged about the central axis of the device to uniformly impart their reciprocating forces without distortion and normal to the inclination of the springs which support the device for reciprocation at the frequency of the current impulses employed to energize the electromagnetic motors and the material handling device with its spring supports having a natural period close to the frequency of the current impulses.

The use of two or more vibratory electromagnetic motors disposed symmetrically about the central axis of the vibratory device provides uniform distribution of the vibratory forces to the device resulting in even flow of the material. Again the plurality of uniformly distributed motors about the central axis of the device provides an efficient and more economical apparatus permitting the use of smaller motors making the structure more readily and easily manufactured and tuned.

A screen surface may be placed over a helical trough surface for the purpose of separating, while simultaneously independently conveying, over both surfaces the different sizes of the material. By the use of these subjacent helical conveying surfaces the length of travel may be increased which when combined with the improved scrubbing action, owing to the inclination, provides substantially complete separation of the different sizes of the material. The circular scrubbing action, together with the vertical and horizontal components of vibration, produced on a screen provides an ideal screening action.

Other objects and advantages appear hereinafter in the following description and claims.

The accompanying drawings show, for the purpose of exemplification without limiting the invention or the claims thereto, certain practical embodiments of the invention wherein:

Fig. 9 is a view in side elevation of a helical screen and conveyor, a part of which is in section, wherein the material passes downwardly; and Fig. 10 is a sectional view taken on the line 10—10 of Fig. 9.

Figure 1:
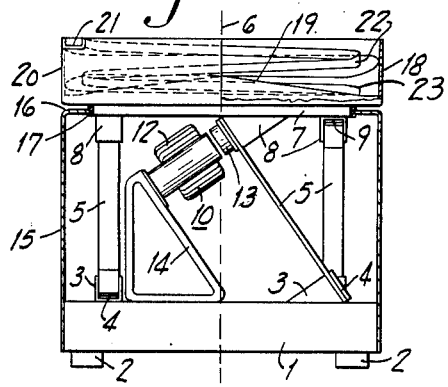
Fig. 1 is a view in side elevation of a vertically disposed helical conveyor for flowing material upwardly.
Figure 2:
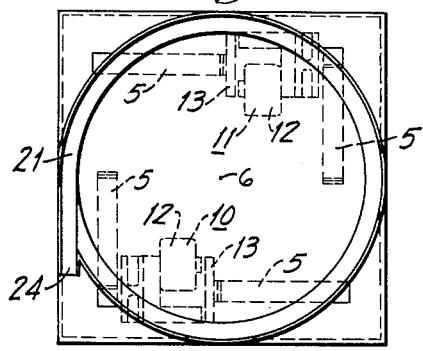
Fig. 2 is a plan view of the structure shown in Fig. 1.
Figure 3:
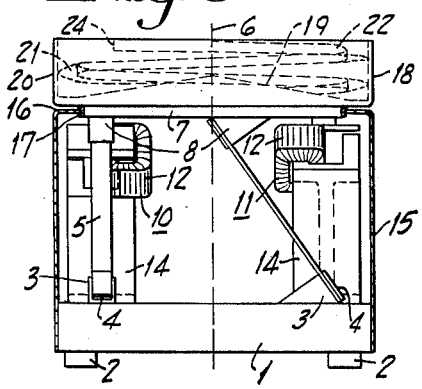
Fig. 3 is a view in side elevation of the structure shown in Fig. 1 as viewed from the left.

Referring principally to Figs. 1 to 3 of the drawings the vibratory device comprises the base or platform 1 which preferably weighs three times more than the weight of the vibrating parts and material which it is designed to support. The platform 1 is supported by the rubber vibration dampeners 2 and its top face has formed thereon a plurality of lugs 3. Each of the lugs 3 is provided with an inclined seat 4 arranged to have secured thereto the lower end of the inclined leaf springs 5. It will be noted that the lugs 3 and their corresponding leaf springs 5 are symmetrically disposed about the vertical central axis 6.

The bowl mounting plate or circular deck 7 is provided with a plurality of depending lugs 8 each of which has an inclined seat 9 arranged to receive and have attached thereto the upper ends of the springs 5. The lugs 8 which depend from the underside of the deck 7 are likewise symmetrically disposed about the central axis 6 and being attached to the upper end of the springs 5 are located at different relative positions about the circumference of the circular deck 7 than that of the lugs 3 on the platform 1.

As shown in Figs. 1 to 3, the helical conveyor is provided with two motors 10 and 11. Each motor is made up on an electromagnetic field member 12 and an armature member 13. The field members 12 are supported on the brackets 14 which are secured to the platform 1. The armatures 13 are secured to corresponding lugs 8 located at diametrically opposite positions equidistant from the central axis 6. The brackets 14 are adjustably secured to the platform 1 so that the electromagnetic motor field members 12 may be accurately positioned in spaced operative relation relative to their respective armature members 13.

In operation the electromagnetic motors are energized with current impulses preferably supplied from alternating current through rectifiers and the amplitude of flexure of the springs 5 is selected to prevent the armatures from striking the core of the field members.

A cover 15 is secured to the base or platform 1 and extends upwardly being provided with an inturned perimetral flange 16 at the upper end thereof which stops short of the circular deck 7 for the purpose of enclosing the springs and the electromagnetic motors to prevent the infiltration of dirt and dust. The flange 16 may be provided with a soft rubber gasket as indicated at 17 which lightly engages the perimeter of the circular deck 7 but does in no way interfere with its reciprocatory movement.

As shown in Figs. 1 to 3, the circular deck 7 is provided with a bowl 18 having an upwardly dished or conical bottom 19 and the upwardly extending cylindrical wall 20. The inner surface of the cylindrical wall 20 is provided with the spiral conveyor surface 21 having the fence or vertical wall 22 which stops short at the bottom as indicated at 23 to receive material or parts from the upwardly dished floor 19 of the bowl. As shown in Fig. 2 the upper end of the conveyor trough extends tangentially from the bowl as indicated at 24 for the purpose of delivering the material which rides up the inclined helical conveyor surface 21.

Figure 4:
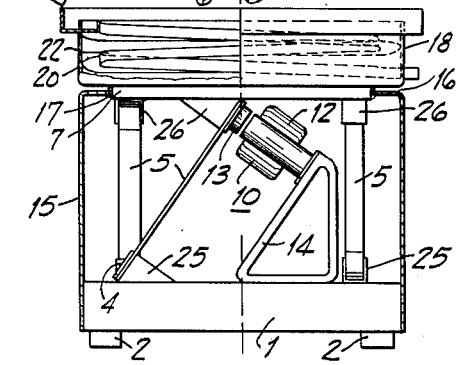
Fig. 4 is a front elevation of the helical conveyor similar to that shown in Fig. 1, but having its springs inclined in the opposite direction to cause the conveyor to operate in conveying the material downwardly.

The structure as disclosed in Fig. 4 is the same as that disclosed in Fig. 1 with the exception that the platform 1 and the circular deck 7 are provided with lugs 25 and 26 having seats that are faced in the opposite direction for receiving the springs 5. However, the bowl 18 and the conveyor 21 mounted therein are constructed of the same helix. By disposing the inclination of the springs 5 in the opposite direction to that shown in Fig. 1, the material will of course be conveyed down the helical conveyor as shown in Fig. 4 in place of up the helical conveyor as in the case of Fig. 1.

Figure 5:
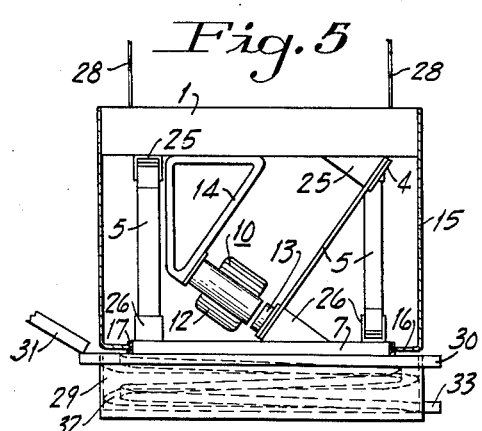
Fig. 5 is a view in side elevation showing a suspended helical conveyor, the construction of which is similar to that shown in Fig. 4.

The structure as illustrated in Fig. 5 is similar to that shown in Fig. 4 with the exception that it is inverted and the platform 1 is suspended from the ceiling by the wires 28. The bowl 29 is provided with a circular trough 30 at its upper end and arranged to receive material from the chute 31. The material being conveyed from the chute to the circular trough 30 will find its way into the bowl 29 and continue down the helical conveyor member 32 to the mouth or outlet end as illustrated at 33. This conveyor may be suspended from the ceiling over the container in which the material is to be fed at a given predetermined rate, which rate may be controlled by regulation of the operation of the vibratory conveyor 31 and the helical conveyor 29.

Figure 6:
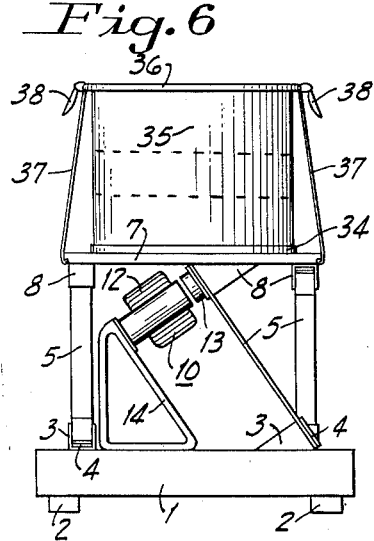
Fig. 6 is a view in side elevation showing the vibratory device comprising this invention as being applied to a packer.

The lower part of the structure as shown in Fig. 6 is similar to the corresponding parts illustrated in Fig. 1 but in place of the bowl with the helical conveyor therein the structure of Fig. 6 is provided with an upwardly extending annular wall 34. This upwardly extending annular wall is arranged to snugly receive the bottom of the receptacle 35 which may be open at the top and its upper rim is engaged by the annular ring member 36 locked in place by means of the straps 37 and the cam type locking levers 38 which engage the ring 36 and hold the container 35 tightly against the deck 7 so that the container will be vibrated as a unitary part of the deck 7. When bulk material is fed to the container 35 and the deck vibrates in a confined inclined arcuate path of movement, the material therein will flow in a circular path around the container 35 and find its own level, thereby uniformly distributing and packing the same. After the material has been thoroughly packed within the container 35 the clamps 38 may be released and the clamping ring 36 removed to permit the container 35 to be lifted from the deck 7. A series of screen baskets may be placed in the receptacle 35 as indicated by the dotted lines for classifying as well as packing.

Figure 7:
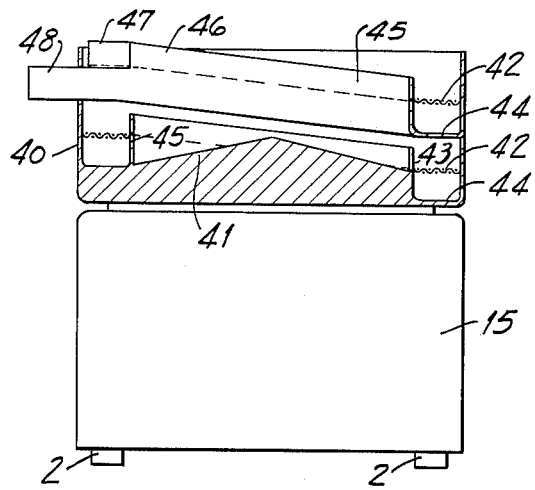
Fig. 7 is a sectional view of a screen disposed over a helical conveyor.

Referring now to Fig. 7, the vibrating motors are similar to that disclosed in Fig. 1 and are enclosed by the cover 15. The cylindrical bowl 40 has the conical false bottom 41 for receiving the material to be screened which flows laterally to the side of the bowl when vibrated in an inclined arcuate path of movement about a vertical axis. The material thus feeds onto the screen conveyor surface 42, the inlet opening 43 of which is disposed at the level of the floor 41 adjacent the cylindrical wall of the bowl. All of the walls of the bowls shown must be rigid so they will not vibrate and they can be made frusto conical or inverted frusto conical to suit the convenience of the job. The helical trough conveying surface 44 starts below the surface of the floor 41 to receive and convey the material initially sifting through the screen. If desired, the screen surface may be initially made as a solid surface such as 44 until it rises sufficiently above the floor 41 to allow room for the trough 44 thereunder to avoid the use of a false bottom floor. However, the trough with its helical conveying surface 44 extends up the wall of the bowl being closed on one side by the bowl and on the other side by the fence 45. The upper portion of the fence 45 is directed to the side of the bowl as indicated at 46 and passes therethrough forming a spout to convey the larger particles of material from the bowl. The lower portion of the trough extends further around the bowl and passes therethrough to form the spout 48 for discharging the smaller sizes of material. Thus, the discharge of the spouts 47 and 48 are circumferentially displaced about the bowl for maintaining the materials independently from one another.

Figure 8:
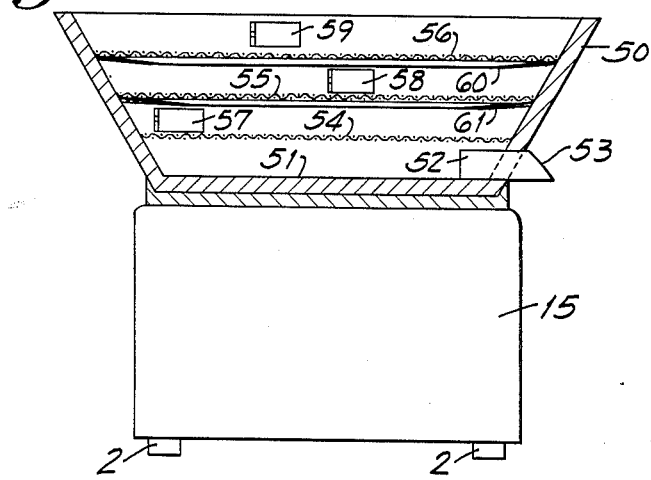
Fig. 8 is a sectional view of a series of horizontally disposed screens of different mesh superimposed on one another over a floor.

Referring to Fig. 8, the bowl 50 is inverted frusto conical in shape and is provided with the floor 51. At one side of the bowl floor an inwardly projecting wall 52 extends substantially tangentially from a circle smaller in diameter than that of the floor 51. This wall catches the materials following a circular path around the floor 51 and directs it out the chute 53 where it may be caught and conveyed. Above the level of the floor the bowl 50 is provided with a series of substantially horizontal screen surfaces 54, 55 and 56. The mesh of each of these screens becomes increasingly larger toward the top of the bowl to provide a gradation of the material being screened. Each screen surface is provided with a door as shown at 57, 58 and 59 which is arranged to swing in over the screen at its level and direct the material flowing around the screen through the door and down a chute. The action of the conveyor motors in vibrating the bowl and screens in a confined inclined arcuate path of movement causes the material dumped on the top screen to flow in a circular path around the screen 56 and the smaller particles precipitate through to the next lower and finer screen and so on until the smallest particles are conveyed from the trough 53. By placing the material in the center of the screen 56 it starts to flow in a spiral path seeking the perimeter of the screen. If the screen is sufficiently large the discharge door may be left permanently open as the material will have had sufficient opportunity to travel in its spiral path which is long enough to have screened all of the smaller particles to the subjacent screen. Sloping circular aprons or funnels 60 and 61 are secured to the bowl to direct the screened material to the center of the next screen therebelow. With this structure, different sizes of materials may be separated independently conveyed from the separating screen.

Referring now to Figs. 9 and 10, the helical screen conveyor 62 consists of the solid helical conveyor surface 63 and the screen conveyor surface 64, both of which are helically wound around and rigidly secured to the central tube 65 that is formed integral with the circular deck 7 which is powered by four motors 10, one for each of the vibrating springs 5 disposed as shown in Fig. 4 for the purpose of causing the material to flow downwardly. At the top of the screen conveyor the tube 65 is provided with a circular trough 66 which has a solid floor and is provided with the initial screen trough 64. Directly under the screen trough 64 the conveyor trough 63 starts. This trough is spaced from the circular trough and is balanced by the counterweight 67. Thus, the entire path of the downwardly extending screen 64 is underlaid by the solid conveyor trough 63 until the screen conveyor approaches the bottom as shown in Fig. 10, where the screen stops just before the solid conveyor surface begins to spiral outwardly as indicated at 68, from which point the conveyor surfaces 63 and 64 are solid and run out at diagonally opposite points. After the conveyor surfaces have been started at the top of the tube or column 65, they are symmetrical to their point of runout and the counterweight 67 at the top may be adjusted to maintain a symmetrical weight distribution under load conditions to insure uniform operation. It is preferable to tune the mechanical vibratory system a few cycles higher than the current impulses driving the system so that it never reaches a resonant condition under maximum load.

While, for clarity of explanation, certain preferred embodiments of this invention have been shown and described, it is to be understood that this invention is capable of many modifications, and changes in the construction and arrangement may be made therein and that certain parts may be employed without the conjoint use of other parts and without departing from the spirit and scope of this invention.

I claim:

1. A material handling device consisting of a base, a frame constructed symmetrically about a vertical axis and carrying a material handling device, a plurality of tuned spring means positioned symmetrically about said axis with their opposite ends attached to said base and to said frame to freely support the same for reciprocation in an inclined arcuate path of movement about said axis, a plurality of electromagnetic reciprocating motors independent of each other and each having an armature member and a field member to induce magnetic forces therebetween when energized by current impulses, mounting means for positioning each of said motor members in operative spaced relation to each other with one motor member fixed relative to said frame and the other motor member fixed relative to said base, said mounting means locating each of said motor members to centrally balance and to direct their magnetic forces at right angles to radii extending from said axis to be effective in imparting arcuate motion to said frame for reciprocating it in its inclined arcuate path of movement and in synchronism with the frequency of the current impulses to be effective in causing the material to flow in the material handling device in a path about said axis.

2. A material handling device consisting of a base, a frame constructed symmetrically about a vertical axis and carrying a material handling device, a plurality of tuned spring means positioned symmetrically about said axis with their opposite ends attached to said base and to said frame to freely support the same for reciprocation in an inclined arcuate path of movement about said axis, a plurality of electromagnetic reciprocating motors independent of each other and each having an armature member and a field member to induce magnetic forces therebetween when energized by current impulses, mounting means for positioning each of said motor members in operative spaced relation to each other with one motor member fixed relative to said frame and the other member fixed relative to said base, said mounting means locating each motor at a radial distance from said vertical axis determined by the force applied by said motor to symmetrically balance the torque of the motors relative to said vertical axis to be effective in imparting arcuate motion to said frame for reciprocating it in its inclined arcuate path of movement and in synchronism with the frequency of the current impulses to be effective in causing the material to flow in the material handling device in a path about said axis.

3. A material handling device consisting of a base, a frame carrying a material handling device and supported for tuned reciprocating motion about a vertical axis and including a plurality of inclined guide means symmetrically disposed about said vertical axis with their opposite ends attached to said base and to said frame to freely guide the latter for reciprocation in an inclined arcuate path of movement about said vertical axis, a plurality of electromagnetic reciprocating motors independent of each other and each having an armature member and a field member to induce magnetic forces therebetween when energized by current impulses, mounting means for positioning said motor members about said vertical axis and in operative spaced relation to each other with one motor member fixed relative to said frame and the other motor member fixed relative to said base and with their magnetic forces applied in the direction of the inclined motion of said frame, the torque created by the force of each of said electromagnetic reciprocating motors being uniformly balanced with respect to said vertical axis and to reciprocate said frame in its inclined arcuate path of movement and in synchronism with the current impulses to cause material to flow in the material handling device in a circular path about said vertical axis.

CARL S. WEYANDT.

References Cited in the file of this patent
UNITED STATES PATENTS

| Number | Name | Date |
| --- | --- | --- |
| 45,341 | Prater | Dec. 6, 1864 |
| 2,336,561 | Muskat | Dec. 14, 1943 |
| 2,464,216 | Devol | Mar. 15, 1949 |